(12) United States Patent
Suzuki

(10) Patent No.: US 8,154,241 B2
(45) Date of Patent: Apr. 10, 2012

(54) IN-VEHICLE ELECTRONIC CONTROL APPARATUS AND STEERING CONTROL SYSTEM

(75) Inventor: Takashi Suzuki, Kariya (JP)

(73) Assignee: Denso Corporation, Kariya (JP)

( * ) Notice: Subject to any disclaimer, the term of this patent is extended or adjusted under 35 U.S.C. 154(b) by 400 days.

(21) Appl. No.: 12/468,305

(22) Filed: May 19, 2009

(65) Prior Publication Data

US 2009/0308683 A1 Dec. 17, 2009

(30) Foreign Application Priority Data

Jun. 11, 2008 (JP) ................. 2008-152504

(51) Int. Cl.
*H02P 23/00* (2006.01)
(52) U.S. Cl. ........ 318/802; 318/799; 318/800; 318/806; 318/809
(58) Field of Classification Search .......... 318/799, 318/800, 802, 806, 809
See application file for complete search history.

(56) References Cited

U.S. PATENT DOCUMENTS

| | | | |
|---|---|---|---|
| 6,904,346 B2 * | 6/2005 | Higashi et al. ............... 701/41 |
| 7,459,879 B2 | 12/2008 | Kezobo et al. | |
| 2005/0229592 A1 * | 10/2005 | Kobayashi ................. 60/387 |
| 2006/0149445 A1 * | 7/2006 | Suzumura et al. ........... 701/41 |
| 2008/0199160 A1 * | 8/2008 | Yamazaki .................. 388/815 |
| 2008/0217099 A1 * | 9/2008 | Reungwetwattana et al. ............... 180/446 |
| 2009/0021207 A1 * | 1/2009 | Kezobo et al. ............ 318/798 |
| 2009/0079371 A1 * | 3/2009 | Suzuki ................. 318/400.02 |
| 2011/0156629 A1 * | 6/2011 | Satou et al. .............. 318/453 |
| 2011/0190986 A1 * | 8/2011 | Bitou et al. .............. 701/41 |

FOREIGN PATENT DOCUMENTS

| | | |
|---|---|---|
| JP | 8-163889 | 6/1996 |
| JP | 2005-295688 | 10/2005 |
| JP | 2007-274849 | 10/2007 |
| WO | WO-2007-129359 | * 11/2007 |

* cited by examiner

*Primary Examiner* — Thomas Dougherty

(74) *Attorney, Agent, or Firm* — Nixon & Vanderhye P.C.

(57) ABSTRACT

An electric power steering system includes a multi-phase electric motor, an inverter connected to the rotary electric machine and an electronic control apparatus. One phase of the motor is pulled up by a resistor. The electronic control apparatus detects disconnection abnormality between the motor and the inverter by checking phase voltages of the inverter by stopping the inverter operation. If disconnection is detected, current is supplied to the remaining normal two phases. The electronic control apparatus detects short-circuit abnormality by checking an electric angle (rotation angle) of the motor.

11 Claims, 9 Drawing Sheets

U → V

U → V

IN-VEHICLE ELECTRONIC CONTROL APPARATUS AND STEERING CONTROL SYSTEM

CROSS REFERENCE TO RELATED APPLICATION

This application is based on and incorporates herein by reference Japanese Patent Application No. 2008-152504 filed on Jun. 11, 2008.

FIELD OF THE INVENTION

The present invention relates to an in-vehicle electronic control apparatus and a steering control system, in which a multi-phase rotary electric machine mounted in an electrically-driven power steering device is controlled by an electric power conversion circuit.

BACKGROUND OF THE INVENTION

Recently many vehicles are equipped with electric power steering systems, in which steering of a vehicle is assisted by toque of a multi-phase (three-phase) electric motor driven when a steering wheel is operated. The three-phase electric motor is connected to a three-phase inverter, which includes switching elements such as transistors for selectively connecting each phase of the motor to the positive terminal and the negative terminal of a direct current (DC) power source. By controlling the three-phase inverter, torque of the motor is controlled thereby to assist steering of the vehicle.

In this electric power steering system, the controllability of the steering angle is likely to be lowered if any one of the electric connection paths such as electric cables between the motor and the inverter is disconnected. For this reason, various countermeasures are proposed.

For example, JP 8-163889 (patent document 1) proposes to check for any short-circuit or disconnection abnormality in electric connection paths based on electric currents actually flowing in a three-phase electric motor in energizing a specified phase of the motor. JP 2005-295688 (patent document 2) proposes to check for any abnormality in electric connection paths based on magnitude of currents actually flowing in a three-phase motor in controlling a three-phase inverter. Further, JP 2007-274849 (patent document 3) proposes to check for any abnormality in electric connection paths based on magnitude of currents actually flowing to a three-phase electric motor in energizing a three-phase inverter.

According to the patent document 1, if the connection path between the specified one of the three phases of the motor and the inverter is disconnected and the specified phase of the motor is also shot-circuited to another phase, this abnormality cannot be detected. According to the patent documents 2 and 3, abnormality may be erroneously detected due to variations in the resistances of the electric connection paths and temperature characteristics of the resistances.

SUMMARY OF THE INVENTION

It is therefore an object of the present invention to provide an electronic control apparatus and steering control system, which accurately detects any abnormality in a multi-phase rotary electric machine and an electric power conversion circuit.

According to one aspect of the present invention, an in-vehicle electronic control apparatus is provided for an electric power steering system, which includes a multi-phase rotary electric machine and a power conversion circuit connected to the rotary electric machine. The in-vehicle electronic control apparatus is configured to control the power conversion circuit to a predetermined operation state to perform predetermined energization of the rotary electric machine. It is further configured to detect abnormality in at least one of the rotary electric machine and the power conversion circuit based on a detected rotation angle of the rotary electric machine caused by the predetermined energization.

If the operation state of the power conversion circuit is predetermined, the energization of the rotary electric machine is performed in the predetermined manner. In this, the torque produced by the rotary electric machine changes periodically in accordance with the rotation angle of the rotary electric machine. At a predetermined rotation position where the torque changes from positive to negative, torque is produced to move back to the predetermined rotation position when the rotation position deviates from the predetermined rotation position. Thus, the rotation angle of the rotary electric machine converges to the predetermined rotation angle. If there arises any abnormality, the energization of the rotary electric machine is not performed in the manner predetermined. As a result, the rotation angle of the rotary electric machine does not converge to the predetermined rotation position. Therefore, the abnormality can be detected by checking the convergence of the rotation angle of the rotary electric machine.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

First Embodiment

Figure 1:
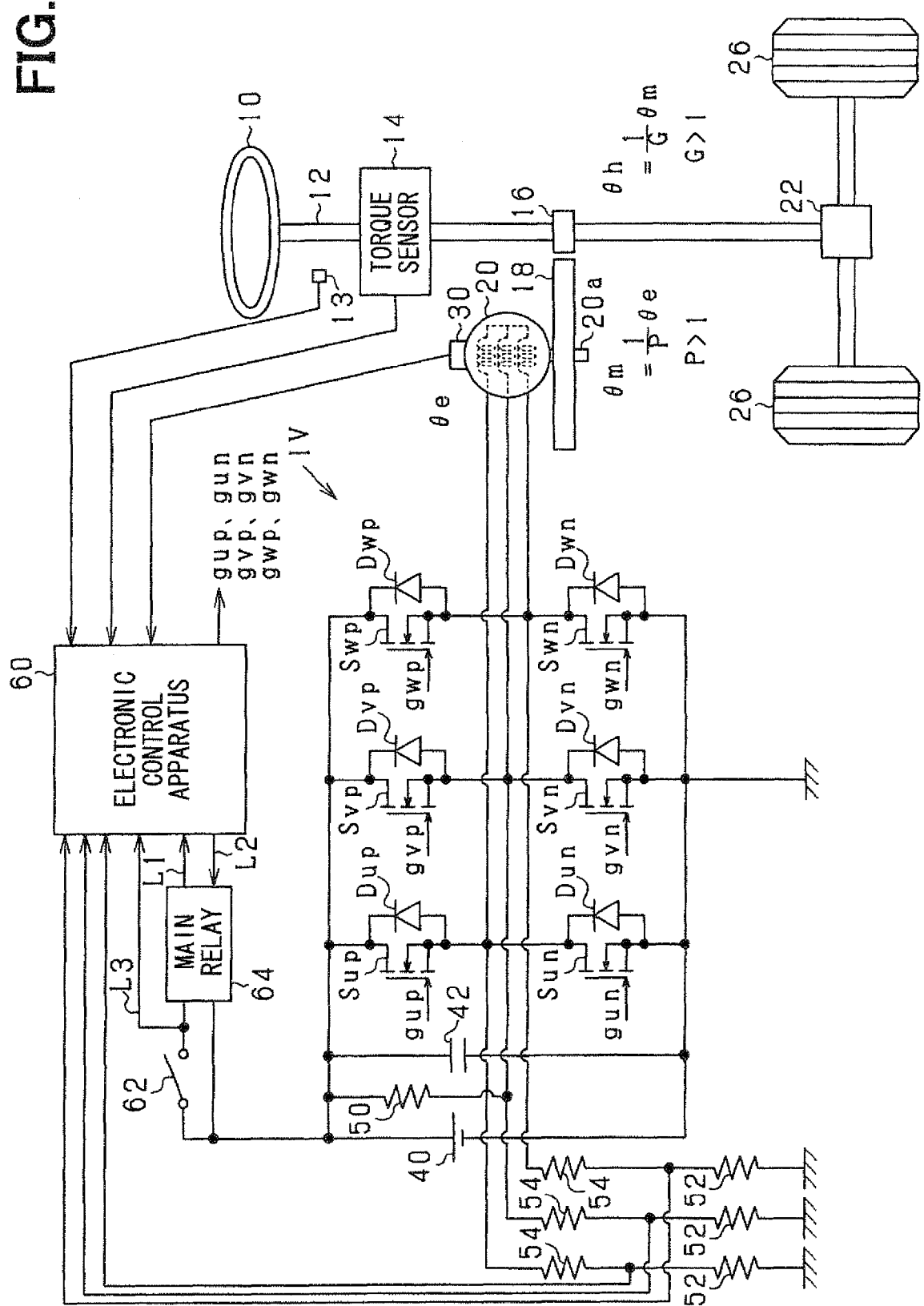
FIG. 1 is a schematic diagram showing a steering control system according to a first embodiment of the present invention.

Referring first to FIG. 1, a vehicle has a steering wheel 10 and tire wheels 26, which are steered in correspondence to the operation of the steering wheel 10 by a driver. The steering wheel 10 is connected to one end of an input shaft 12 to rotate the input shaft 12. A steering angle sensor 13 and a torque sensor 14 are provided near the input shaft 12. The steering angle sensor 13 detects rotation angle of the input shaft 12, and the torque sensor 14 detects torque applied from the steering wheel 10 to the input shaft 12. The input shaft 12 is mechanically coupled to a main gear 16 with the rotation axes thereof being coaxial to each other.

The main gear 16 is engaged with an assist gear 18, which is fixedly coupled to an output shaft 20*a* of a multi-phase electric motor 20 having three phases U, V, W. The other end of the input shaft 12 is mechanically fixed to a transfer device 22. The transfer device 22 transfers rotation of the input shaft 12 to the tire wheels 26 by changing a rotation transfer ratio.

The motor 20 is a synchronous motor having three surface permanent magnets. The motor 20 is energized by a battery (DC power source) 40 through an inverter IV, which is an electric power conversion circuit. The inverter IV is configured with six switching elements (transistors), which selectively connect each phase (phase coil) of the motor 20 to the positive terminal and the negative terminal of the battery 40.

A first pair of series-connected switching elements Sup and Sun, a second pair of series-connected switching elements Svp and Svn, and a third pair of series-connected switching elements Swp and Swn are connected in parallel to form a bridge circuit. The junction between the series-connected switching elements in each pair is connected to U-phase, V-phase and W-phase of the motor 20. Free-wheeling diodes Dup, Dun, Dup, Dvn, Dwp and Dwn are connected to the switching elements Sup, Sun, Svp, Svn, Swp and Swn, respectively.

The inverter IV is connected to the positive terminal and the negative terminal of the battery 40 at its high potential-side input terminal and low potential-side input terminal, respectively. The negative terminal of the battery 40 and the low potential-side input terminal of the inverter IV are grounded. A capacitor 42 is connected in parallel to the battery 40 and the inverter Iv to regulate the voltage supplied to the inverter IV.

An electronic control apparatus 60 is configured to perform steering torque assist control in response to the operation of the steering wheel 10, by controlling the inverter IV for the motor 20 as a control object. Specifically, the electronic control apparatus 60 receives detection output values of the steering angle sensor 13, the torque sensor 14 and a rotation angle sensor 30, which detects the electric angle of the motor (rotation position or angle θe of a rotor of the motor 20), and controls the inverter IV and hence the motor 20 based on the detection output values. Thus, the electronic control apparatus 60 assists the steering angle control in accordance with the driver's operation on the steering wheel 10.

The electronic control apparatus 60 is supplied with the electric power of the battery 40 through an ignition switch 62, a main relay 64 and a power supply line L1. The main relay connects the battery 40 with the power supply line L1 when the ignition switch 62 is turned on or a relay drive signal (relay turn-on signal) is applied through a signal line L2. The electronic control apparatus 60 therefore becomes operative with the power supply from the battery 40, when the ignition switch 62 is turned on and the power supply line L1 and the battery 40 are made conductive by the main relay 64.

The electronic control apparatus 60 is further configured to monitor on/off condition of the ignition switch 62 through a signal line L3 while being maintained operative with the electric power from the battery 40. The electronic control apparatus 60 continues to produce the relay drive signal to the main relay 64 through the signal line L2 when the ignition switch 62 is turned off, so that the electronic control apparatus 60 is maintained operative until it completes predetermined processing or routines required to perform before power shutdown. Thus, even after the ignition switch 62 is turned off, the electric power is supplied from the battery 40 to the electronic control apparatus 60 through the main relay 64 and the power supply line L1 until the electronic control apparatus 60 completes the predetermined processing.

The electronic control apparatus 60 becomes operative when the ignition switch 62 is turned on and detects any abnormality in electric wiring systems including the control object and the like in advance of performing steering angle control assist processing. Among various processing (routines), a routine for checking for disconnection abnormality in an electric wiring system is described below. The electric wiring system includes each phase coil of the motor 20, inverter IV and phase wiring or lines connecting the motor 20 and the inverter IV.

To simplify the detection of disconnection abnormality by the electronic control apparatus 60, the following hardware configuration is provided.

Specifically, a specified one phase (for example V-phase) of the motor 20 is pulled up by connecting the junction between the V-phase and the inverter IV to the positive terminal of the battery 40. Each phase of the motor 20 is grounded through a series-connected resistors 52 and 54. That is, each junction between the switching elements Sup and Sun, Svp and Svn, and Swp and Swn is connected to the resistors 52 and 54.

The voltage developed at the junction between the resistors 52 and 54 is applied to the electronic control apparatus 60 as indicating each phase voltage of the motor 20 (that is, a voltage between switching elements). The electronic control apparatus 60 performs a disconnection abnormality checking routine based on the phase voltages produced when all the switching elements of the inverter IV are in the turned-off condition.

If there is no abnormality in any phases (motor coils and wirings to the motor), all the phase voltages become equal to the voltage pulled-up by the resistor 50 because all the phases are connected one another in the motor 20 through the phase coils of the motor 20.

If only the U-phase is disconnected between the inverter IV and the motor 20, only the U-phase junction between the switching elements Sup and Sun is grounded through the resistors 52 and 54. The same is true for the W-phase, if it is disconnected. If the V-phase is disconnected between the inverter IV and the motor 20, the V-phase junction between the switching elements Svp and Svn is pulled up to the battery voltage by the resistor 50 but both the U-phase junction and the W-phase junction are grounded. Thus, it is possible to detect whether all the phases are normal or one of the phases is abnormal (disconnected), based on the phase voltages developed by the resistors 52 and 54.

Figure 2A:
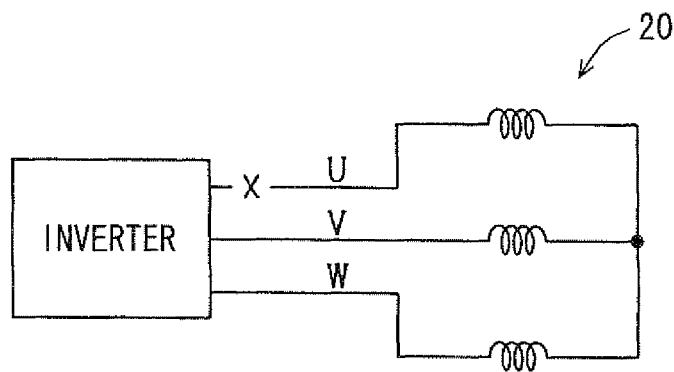
FIGS. 2A to 2C are diagrams showing examples of disconnection abnormality in the first embodiment.
Figure 2B:
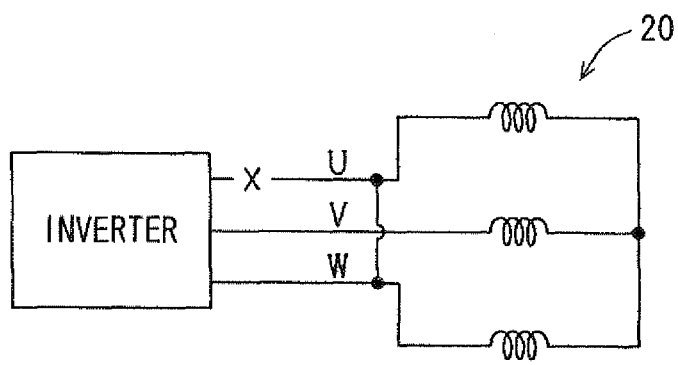

The electronic control apparatus 60 is configured to perform a steering angle control assist routine by controlling, when one phase is disconnected, the switching elements of the inverter IV connected to the other two phases. For example, the assist control may be performed as disclosed in WO 2005/091488. Specifically, if one phase (for example, U-phase) is disconnected as indicated by "x" in FIG. 2A, the remaining two phases (V and W) are energized by supply of electric current Id as shown by a solid line in FIG. 2C. As a result, as shown by a two-dot chain line in FIG. 2C, substantially uniform torque Td is produced irrespective of the rotation angle of the motor 20. Thus, by controlling the absolute value of the currents in correspondence to the required torque, the torque of the motor can be controlled to produce desired torque, thereby performing the assist routine.

Figure 2C:
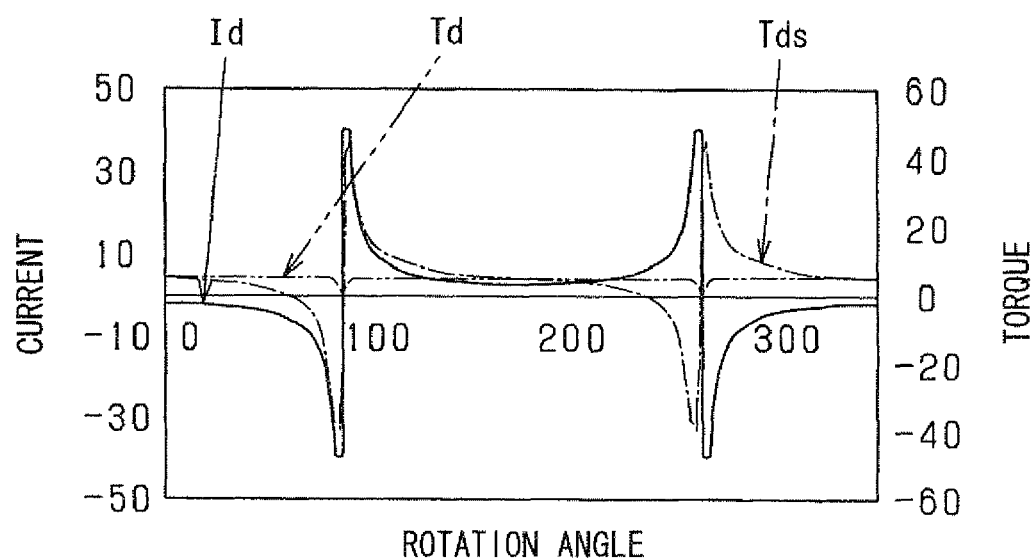

Under the condition that one phase is disconnected (U in FIG. 2A), the same phase may be further short-circuited to another phase (W) as shown in FIG. 2C. If the two phases (V and W) are energized with the currents Id in the same manner as in the case of FIG. 2A, torque Tds produced by the motor 20 will change greatly in accordance with the rotation angle of the motor 20 as shown by one-dot chain line in FIG. 2C.

To counter this adverse effect, the electronic control apparatus 60 is configured to check whether there is short-circuit abnormality in addition to disconnection abnormality in one phase, and energize the motor 20 in different way from that (Id) shown in FIG. 2C. The short-circuit abnormality is detected in the following manner.

Figure 3A:
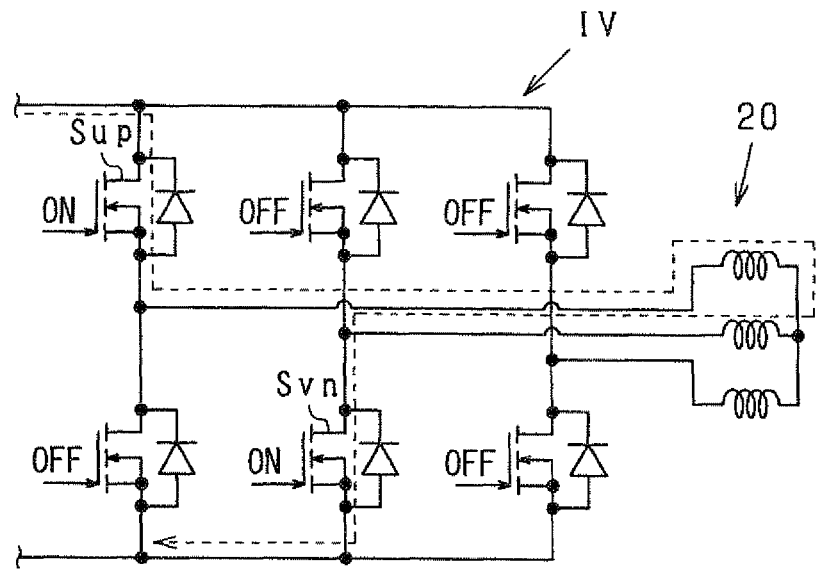
FIGS. 3A and 3B are diagrams showing principle of detection of a short-circuit in the first embodiment.
Figure 3B:
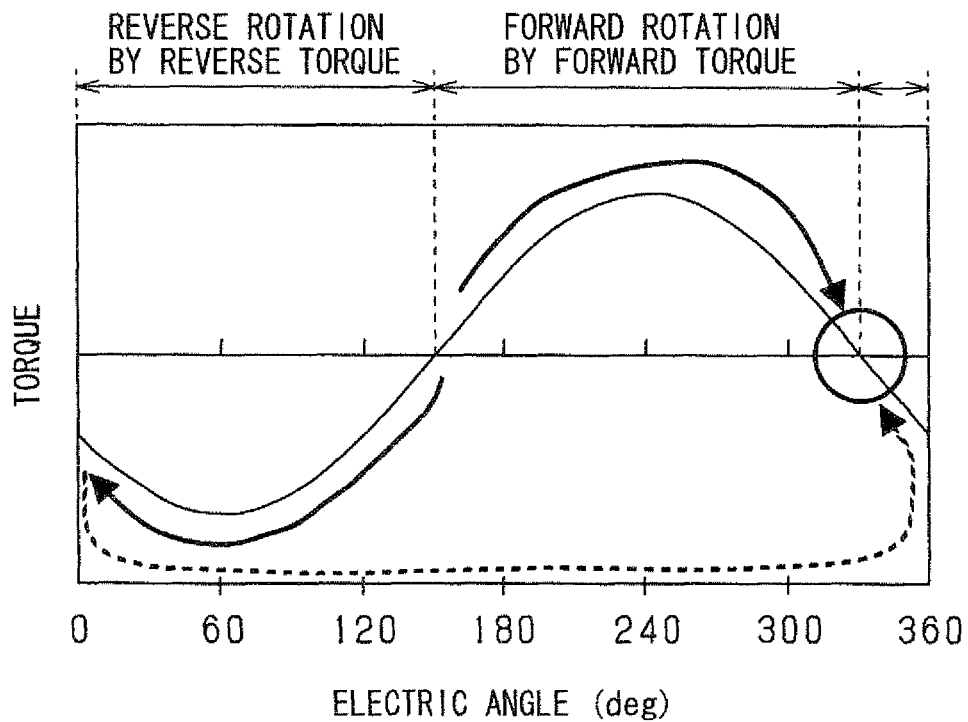

It is assumed that energization of the motor 20 is switched from one phase (for example, U) to another phase (for example, V) under the normal condition (no disconnection nor short-circuit) of the motor 20. This switching is attained by turning on the high potential-side switching element Sup of U-phase and the low potential-side switching element Svn of V-phase as shown in FIG. 3A. The motor 20 is energized by the current indicated by a dotted line in FIG. 3A. The torque produced by the motor 20 and the rotation angle θe of the motor 20 in this case are shown in FIG. 3B. As understood from FIG. 3B, the torque changes in generally a sine waveform in one electric angle cycle period. Therefore, when the electric angle deviates from a predetermined angle (for example, 330 degrees), torque is produced to reduce a deviation from the predetermined angle. This torque generation is described in more detail.

The following equation holds among torque T, electric angular velocity ω, induced phase voltages eu, ev, ew induced in each phase U, V, W, and phase currents iu, iv, iw flowing in each phase from law of conservation of energy.

$$T\omega = eu \times iu + ev \times iv + ew \times iw \quad (c1)$$

Each of the induced phase voltages eu, ev, ew is a function of the rotation angle θe, and expressed as follows by using a counter electromotive force constant Ke.

$$eu = -Ke \times \omega \times \sin \theta e \quad (c2)$$

$$ev = -Ke \times \omega \times \sin e(\theta e - 20) \quad (c3)$$

$$ew = -Ke \times \omega \times \sin e(\theta e + 120) \quad (c4)$$

The following equation (c5) holds by using the current value I, when the electric current is supplied from the U-phase to the V-phase as shown in FIG. 3A.

$$T = \{-Ke \times \omega \times \sin\theta e \times I - Ke \times \omega \times \sin(\theta e - 120) \times (-I)\}/\omega \quad (c5)$$

$$= (\sqrt{3}) \times Ke \times I \times \sin(\theta e + 30)$$

In consideration of the process of deriving the equation (c5), it will be readily understood that the torque T, which is produced when the current is supplied from a specified one phase to another phase, generally changes in the sine waveform relative to the rotation angle θe and the period of change corresponds to one electric angle cycle period. Therefore, when the energization (current supply) is made from the specified one phase to the different phase, the rotation angle θe of the motor 20 is fixed to the predetermined rotation angle.

Figure 4A:
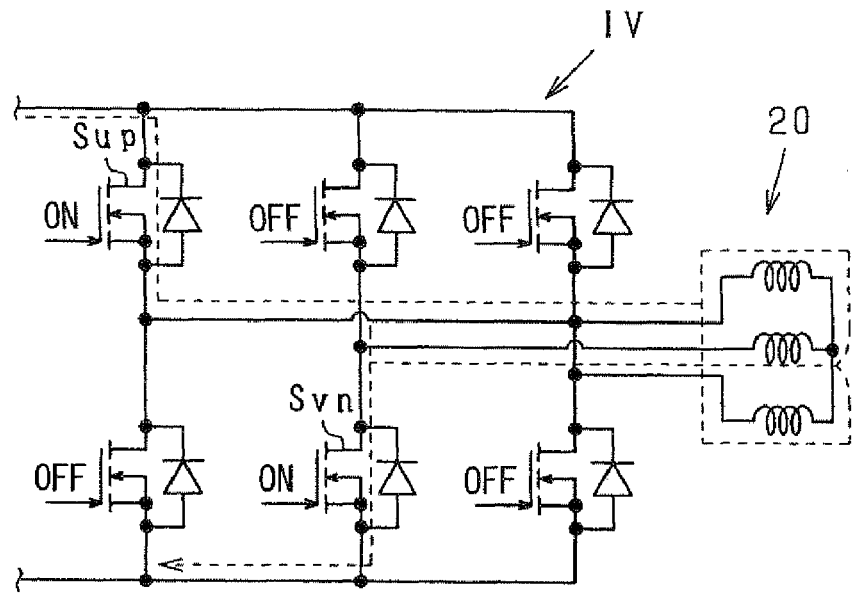
FIGS. 4A and 4B are diagrams showing principle of detection of a short-circuit in the first embodiment.
Figure 4B:
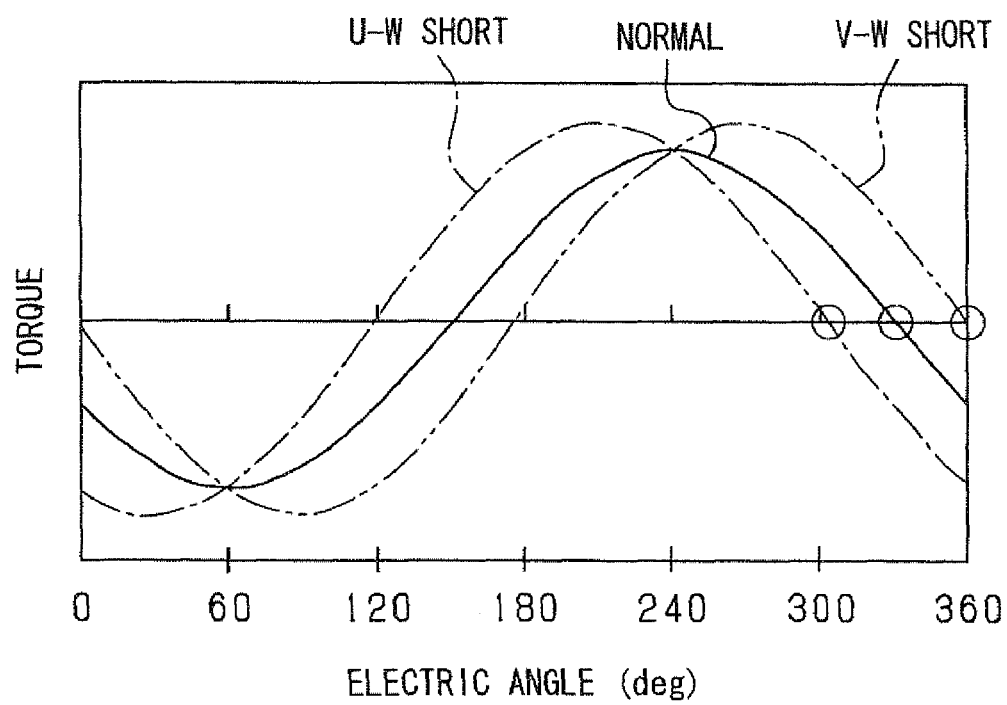

As shown in FIGS. 4A and 4B, when the energization is made from the specified one phase to the different phase, the rotation angle fixed by the energization changes if one of these phases (specified one phase) is short-circuited to the different phase.

If the inverter IV is controlled to perform energization from the U-phase to the V-phase under a condition that the U-phase and the V-phase are short-circuited to each other, the current flowing in the V-phase equals a sum of the currents flowing in the U-phase and the W-phase. In consideration of the symmetric property, the current in the U-phase and the current in the W-phase are assumed to be substantially equal. Therefore, by applying the current value I to the V-phase current iv in the equation (c1), the following equation is derived.

$$T = -Ke \times I/2 \times \{\sin\theta e - 2 \times \sin(\theta e - 120) + \sin(\theta e + 120)\} \quad (c6)$$

$$= 3 \times Ke \times I \times \sin(\theta e + 60)$$

For this reason it is understood that the rotation angle fixed due to energization between the U-phase and the V-phase will deviate 30 degrees from the rotation angle of normal time, when the U-phase and W-phase are short-circuited to each other.

Torque T is calculated in the same manner for the case that the V-phase and the W-phase are short-circuited to each other. From these two calculation results, the rotation angles fixed differ from each other between the short-circuit in U-V phases and the short-circuit in V-W phases. This difference is shown in FIG. 4B.

As described above, the short-circuit abnormality can also be detected in addition to the detection of disconnection abnormality by the electronic control apparatus 60 by energizing the remaining two phases, which are not disconnected, and using the convergence value of the rotation angle θe at that time.

Figure 5:
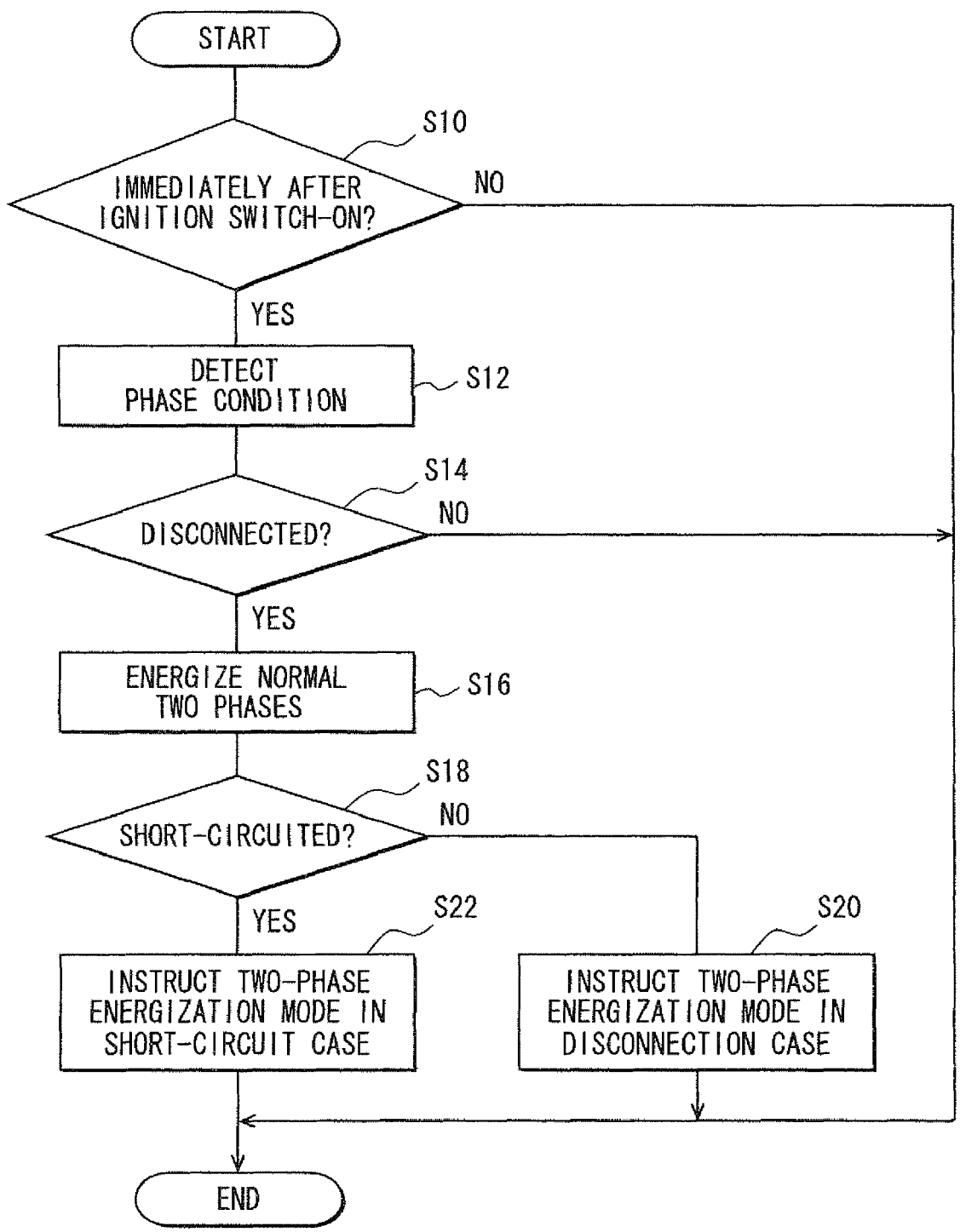
FIG. 5 is a flowchart showing an abnormality checking routine executed in the first embodiment.

The abnormality may be detected by an abnormality checking routine (processing), which is shown in FIG. 5 and executed at every predetermined interval by the electronic control apparatus 60.

In this routine, it is first checked at S10 whether it is immediately after the ignition switch 62 has been turned on. This step is for checking whether it is the time to perform the abnormality detection. If it is immediately after the turn-on of the ignition switch 62, it is so assumed that the steering angle control assist routine need not be started immediately. Therefore, this time is used as a period of processing abnormality detection.

If determination at S10 is YES, the predetermined conditions (voltage, current, etc.) are detected with respect ot each phase U, V and W. It is then checked at S14 whether there is disconnection abnormality in any one of the phases. If the determination at S14 is YES, the remaining two phases, which are normal and not disconnected, are energized by supplying current thereto at S16.

For example, if the disconnection abnormality is detected in the U-phase, the V-phase high potential-side switching element Svp and the W-phase low potential-side switching element Swn are turned on. If the disconnection abnormality is detected in the V-phase, the W-phase high potential-side switching element Swp and the U-phase low potential-side switching element Sun are turned on. If the disconnection abnormality is detected in the W-phase, the U-phase high potential-side switching element Sup and the V-phase low potential-side switching element Svn are turned on. The order of turning on the switching elements among three phases need not be in the order of U, V and then W, but may be in the opposite order, that is, W, U and then V.

Following S16, it is further checked at S18 whether there is short-circuit abnormality. This check may be made with reference to the convergence value of the rotation angle ee detected by the rotation angle sensor 30. That is, if the rotation angle θe changes in response to the two-phase motor energization control at 516, the convergence value is determined to be a value at the time of disappearance of change. If the rotation angle θe does not change, the convergence value θe is determined to be a value, which remained unchanged. It is determined whether the short-circuit abnormality is present based on whether the determined convergence value θe is in a range assumed to correspond to the no-abnormality (no short-circuit) case or to the abnormality (short-circuit) case.

If no short-circuit abnormality is determined (518: NO), the operation mode of the inverter IV for starting the control of the motor 20 is instructed to be the motor energization mode shown by the solid line in FIG. 2C. If the short-circuit abnormality is determined (S18:YES), the operation mode of the inverter IV for starting the control of the motor 20 is instructed to be the motor energization mode at S22. This energization mode is shown by a solid line in FIG. 6, which shows an example of energization of the motor 20 in a case that the U-phase is disconnected and short-circuited to the V-phase.

It is so assumed that, when the U-phase is disconnected and short-circuited at a point on the side of the motor 20 than from the disconnected point, substantially the equal currents will flow in the U-phase and the V-phase because of symmetric property and each current will be one-half (½) of the current I, which flows in the W-phase. Therefore, the torque T produced by the motor 20 by the above motor energization control is calculated as follows in consideration of the equation (c1).

$$T=-Ke \times I \times \{\sin \theta e + \sin(\theta e-120) - 2 \times \sin(\theta e+120)\}/2 \quad (c7)$$

From equation (c7), the current I required to produce the torque T is calculated as follows.

$$I=-2 \times T/Ke \times I \times \{\sin \theta e + \sin(\theta e-120) - 2 \times \sin(\theta e+120)\} \quad (c8)$$

Figure 6:
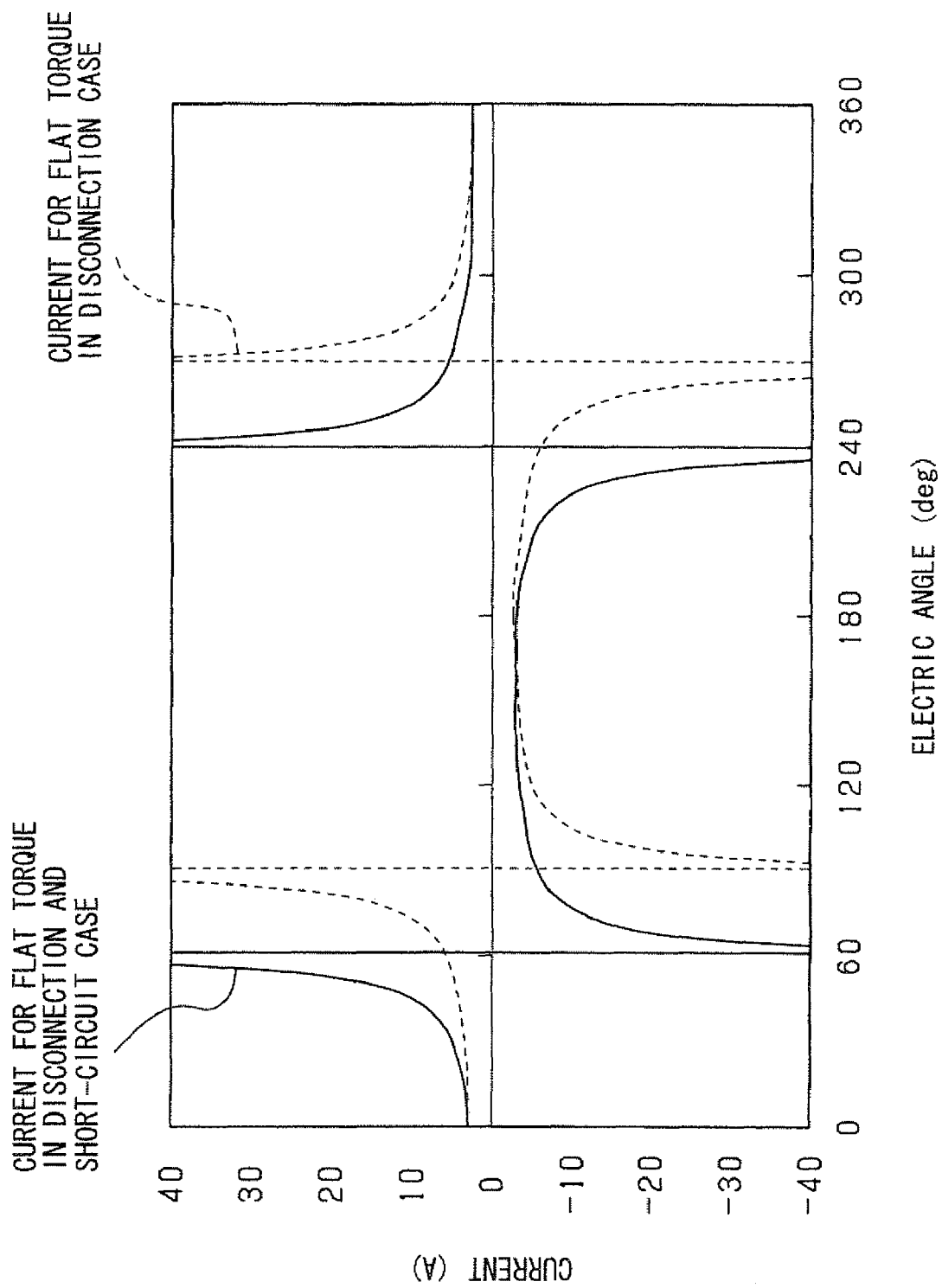
FIG. 6 is a diagram showing energization state in the case of disconnection abnormality in the first embodiment.

The current I calculated by the equation (c8) to maintain the torque T substantially unchanged, that is, to attain flat torque, irrespective of the rotation angle θe is shown by the solid line in FIG. 6. For comparison, the current I supplied to the motor 20 in the mode instructed at S20 is shown exemplarity by a dotted line in FIG. 6. This current I indicated by the dotted line will also be calculated in the same manner as described above.

The abnormality checking routine shown in FIG. 5 is terminated, if the determination at S10 or S14 is NO, or after S20 or S22 is executed.

As described above, when the disconnection abnormality is detected in any one of the phases of the motor 20, more specifically in any one of the electric current supply paths corresponding to the phase coils of the motor 20, the presence or absence of the short-circuit abnormality is further checked for to thereby more specifically identify the type of abnormality. As a result, more appropriate control can be performed to match the type of abnormality.

If the motor 20 is forcibly energized to detect the short-circuit abnormality immediately after the turn-on of the ignition switch 62, the main gear 16 will be rotated causing the steering wheel 10 tend to rotate. However; this rotation can be made negligible. For this purpose, the number P of magnetic pole pairs of the motor 20 may be set to 8 or more and the gear ratio, which is a ratio of the number of rotations of the output shaft 20a of the motor 20 relative to the number of rotations of the main gear 16 is set to 18 or more. The amount of change in the rotation angle θe caused by the abnormality checking routine will be at most 180 degrees or so. Therefore, according to the simplified calculation, the amount of change in the rotation of the input shaft 12 will be at most {(180/(8×18)}, that is, at most about 1.

In actuality, mechanical plays exist between the main gear 16 and the assist gear 18, and between the input shaft 12 and the steering wheel 10. Therefore, the amount of change of the steering wheel 10 estimated as above will become substantially zero and will not be sensed by the driver.

The first embodiment described above has the following features.

(1) The presence or absence of the short-circuit abnormality is determined based on the convergence value of the rotation angle θe of the motor 20 caused by the motor energization control performed by fixing the control operation (state) of the inverter IV.

(2) The disconnection abnormality is detected with respect to the electric current path between one phase of the motor 20 and corresponding one phase of the inverter IV, and the short-circuit abnormality is detected by energizing the motor 20 with the current supply to the two phases, which are normal and have no disconnection abnormality. As a result, the short-circuit abnormality detection can be performed accurately irrespective of the presence or absence of the disconnection abnormality.

(3) The disconnection abnormality is detected based on each phase voltage of the inverter IV developed by pulling up a specified one of the inverter IV and the junction with the inverter IV and turning off all of the switching elements of the inverter IV are all turned off. As a result, the disconnection abnormality can be detected in a simplified manner and speedily.

(4) When one phase is disconnected, the torque T of the motor 20 is controlled by motor energization control by the switching elements of normal two phases. In this instance, the motor energization control modes are differentiated between the cases, in which the short-circuit abnormality is detected and not detected. As a result, the inverter IV can be operated in the modes most suited to the type of abnormality, and hence the controllability of the torque T of the motor 20 can be maintained high.

(5) The short-circuit abnormality is detected by energizing the motor 20 in a period, in which the motor 20 is not required to be driven. As a result, the energization of the motor 20 for the short-circuit abnormality is prevented from affecting adversely the controllability of the steering angle.

(6) The disconnection abnormality is detected in a period, in which the motor 20 is not required to be driven. As a result, all the switching elements of the inverter IV can be maintained in the off-state for the disconnection abnormality detection.

Second Embodiment

Figure 7:
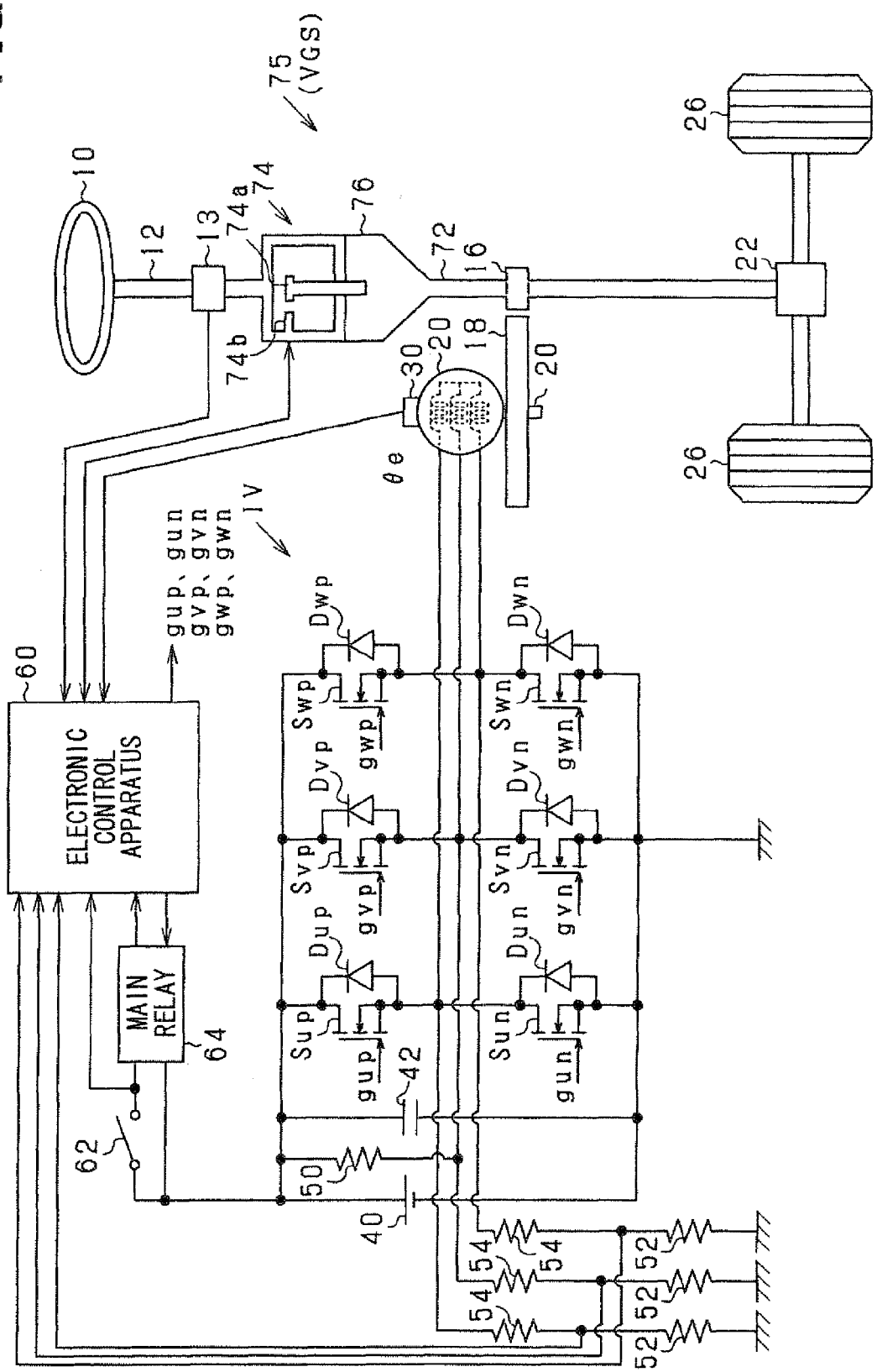
FIG. 7 is a schematic diagram showing a steering control system according to a second embodiment of the present invention.

A second embodiment is shown in FIG. 7, and is partly different from the first embodiment. In FIG. 7, the same or similar parts as in the first embodiment are denoted with the same or similar reference numerals used in FIG. 1.

In the second embodiment, the electric power steering system uses a variable gear system (VGS) 75, which includes an electric motor 74 to variably change a gear ratio. The VGS 75 is interposed between the input shaft 12 and an output shaft 72 to which the rotating force is applied by the motor 20 thereby to apply steering torque. The VGS 75 varies the amount of rotation of the output shaft 72 relative to that of the input shaft 12. This may be attained by mechanically coupling one of the input shaft 12 and the output shaft 72 to a stator of the motor 74 of the VGS 75 and mechanically coupling the other to a rotor 74a of the motor 74. In this embodiment, the input shaft 12 and the output shaft 72 are mechanically coupled to the stator and the rotor 74a of the motor 74, respectively. A lock pin 74b is fixed to the stator of the motor 74 and engageable with the rotor 74a, so that the relative rotation between the stator and the rotor 74a is prevented when the lock pin 74b is engaged with the rotor 74a.

The rotor 74a is mechanically coupled to the output shaft 72 through a gear reduction mechanism 76. The output shaft 72 is coupled to the transfer device 22. With this configuration, in which the input shaft 12 is coupled relatively rotatably to the output shaft 72 coupled with the tire wheels 26 through the transfer device 22, the freedom of actual steering angle control can be enhanced and the steering angle control can be attained more finely than the steering wheel 10 can provide.

The steering angle sensor 13 is provided near the input shaft in the similar manner as in the first embodiment.

Figure 8:
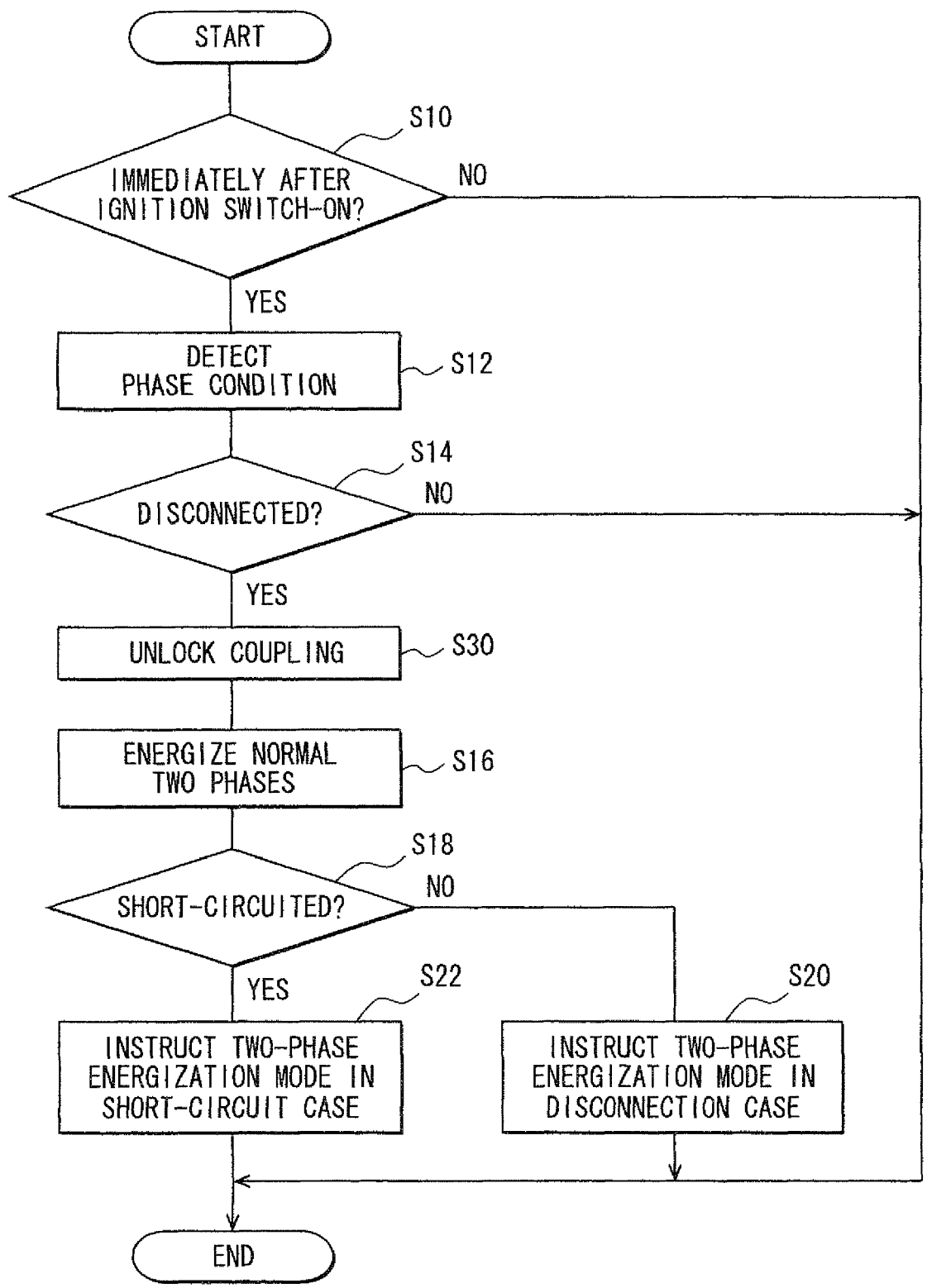
FIG. 8 is a flowchart showing an abnormality checking routine executed in the second embodiment.
Figure 9:
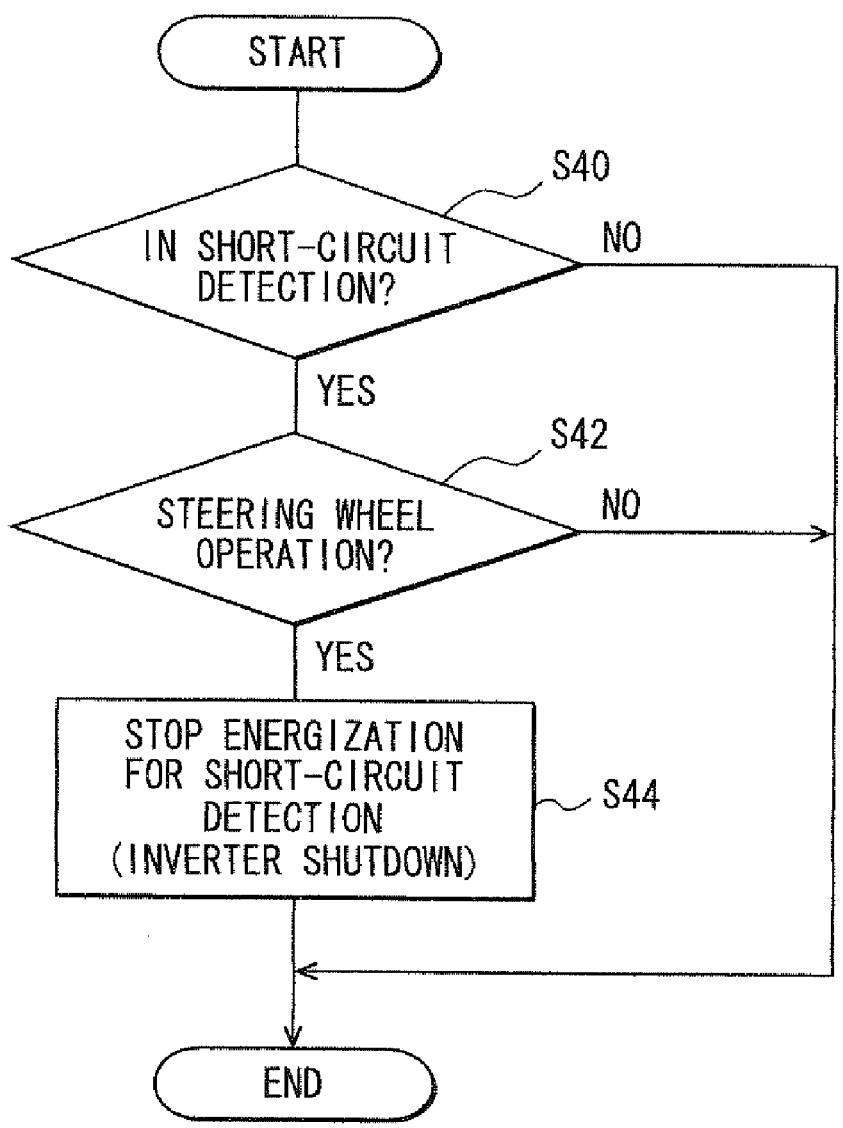
FIG. 9 is a flowchart showing an energization forced stopping routine executed in a third embodiment of the present invention.

The electronic control apparatus 60 is configured to perform an abnormality checking routine shown in FIGS. 8 and 9 at a predetermined interval. The routine shown in FIG. 8 is different from that shown in FIG. 5 in that S30 is additionally executed.

According to the routine shown in FIG. 8, if the disconnection abnormality is detected (S14: YES), the locking of the stator and the rotor 74a by the lock pin 74b, that is, locking of the motor 74, is released or unlocked at S30. Normally the motor 74 is locked by the lock pin 74b from the standpoint of safety and the like immediately after the ignition switch 62 is turned on to allow the travel of the vehicle. This lock condition is maintained until predetermined routines required to be executed before the travel of the vehicle are completed. However, this lock condition is cancelled at S30, so that the rotation force of the output shaft 72 may not be transferred to the input shaft 12 when the motor energization control of the motor 30 is performed at S16.

The second embodiment provides the following advantage in addition to the advantages (1) to (6) of the first embodiment.

(7) BY releasing the lock of the motor 74 before the motor energization control for the short-circuit abnormality detection, the output shaft 72 is restricted from transferring its rotation force to the input shaft 12.

Third Embodiment

A third embodiment is shown in FIG. 9, which is executed at a predetermined interval in the motor energization control for the short-circuit abnormality detection.

In this routine, it is checked at S40 whether it is in the short-circuit abnormality detection operation, that is, whether the motor energization control is being performed for the short-circuit abnormality detection. If such motor energization control is being performed (S40: YES), it is further checked at S42 whether the steering wheel 10 is operated by the driver. This check may be made based on at least one of the detection output values produced by the steering wheel sensor 13 and the torque sensor 14.

If the steering wheel 10 is operated (S42: YES), the inverter IV is shut down at S44 to stop the motor energization control, which is to be performed for the short-circuit abnormality detection. Specifically, all the switching elements of the inverter IV are turned off forcibly. This step is performed primarily so that the rotating force of the motor 20 may not be transferred to the steering wheel 10. This step is also performed so that the operation of the steering wheel 10, which applies force to the output shaft 20a of the motor 20, will not cause variations in the convergence value nor lower the accuracy in the short-circuit abnormality detection.

If the determination at S40 or S42 is NO or execution of S44 is completed, the routine of FIG. 9 is terminated.

The third embodiment provides the following advantage in addition to the advantages (1) to (6) of the first embodiment.

(8) The steering wheel 10 is surely protected from receiving unwanted force caused by the motor energization control performed for the short-circuit abnormality detection, by forcibly stopping such motor energization control when it is likely that the steering wheel 10 is operated.

Other Embodiments

The above embodiments may be modified in the following manner.

The second embodiment may be modified in such a manner that the first embodiment is modified to the third embodiment.

In the third embodiment, the motor energization control for the abnormality detection is forcibly stopped when the steering wheel 10 is operated. However, the special processing for such a case is not limited to thereto. The operation on the steering wheel 10 will apply force to the main gear 16, and affects the rotation angle of the output shaft 20a of the motor 20 and causes deviation in the convergence value of the rotation angle. Therefore, it is preferred to check the abnormality in consideration of the operation of the steering wheel 10.

In each of the above embodiments, the short-circuit abnormality detection may be made irrespective of the presence or absence of the disconnection abnormality. It is however preferred to perform the short-circuit abnormality detection after the disconnection abnormality detection.

Specifically, the short-circuit abnormality detection may be performed as described above with respect to the embodiments when the disconnection abnormality is detected. If no disconnection is detected, however, the short-circuit abnormality may be detected by performing the motor energization control, in which an upper arm (high potential-side switching element) of a specified one phase and a lower arm (low potential-side switching element) of a different phase are turned on. In this case, the motor energization is preferably performed with respect to three combinations of phases, that is, U and V, V and W, and W and U.

In energizing the motor 20 for the abnormality detection, the ratio of rotation of the input shaft 12 relative to the rotation of the output shaft 72 of the VGS 75 may be set to a minimum value in a manner different from that of the second embodiment. For example, if the input shaft 12 and the output shaft 72 of the VGS 75 are disengageable from each other, the VGS 75 may be controlled electronically so that a reciprocal 1/G of the gear ratio G becomes a maximum.

The motor control for the abnormality detection in the period, in which the motor 20 is not required to be driven, is not limited to such control as performed in the first embodiment and the second embodiment. For example, in a vehicle in which a plurality of switches (ignition switch, starter switch, accessory switch, etc.) is turned on sequentially in accordance with turn (rotation) angles of a key, the motor energization control for the abnormality detection may be triggered in response to the turn-on of any one of the switches.

The motor energization control for the abnormality detection is not limited to the period immediately after the electronic control apparatus 60 is turned on, that is, before a motive power generator such as an engine is started. For example, it may be performed in a period, which follows after the vehicle is stopped and its motive power generator is stopped. This can be performed by the electronic control apparatus 60 by being triggered by the turn-off of the ignition switch 62. Alternatively, it may be performed by the electronic control apparatus 60 by activating the electronic control apparatus 60 from its off-state independently from the turn-off of the ignition switch 62 when a predetermined time is measured by a timer.

The electric power steering system is not limited to the one shown in FIGS. 1 and 7. For example, the input shaft 12 and the output shaft 72 for the tire wheels 26 need not be mechanically coupled to each other. It may be steer-by-wire type, which detects the operation of the steering wheel 10 and rotates the output shaft 72 in correspondence thereto. Thus, even if the motor energization for the abnormality detection is not forcibly stopped when the steering wheel 10 is operated, the operation of the steering wheel 10 will not be changed by the energization control.

The hardware configuration for the disconnection abnormality detection is not limited to an example that pulls up a specified one phase, but may be an example that pulls down a specified one phase to the ground.

The disconnection abnormality detection may be performed in various ways. For example, the motor energization may be performed by turning on two upper arms (high potential-side switching elements) of specified two phases and one lower arm (low potential-side switching element) of the remaining one phase, and the disconnection abnormality may be checked for based on the convergence value of the rotation angle of the output shaft 20a of the motor 20. This is because the convergence values will differ from each other between the cases, in which one of the specified two phases is disconnected and both of the specified two phases are not disconnected.

The short-circuit abnormality detection, which is performed based on the detection value of the rotation angle of the rotary electric machine when the power conversion circuit is controlled to supply current from the specified phase to the difference phase, is not limited to the control in which the current is supplied from the specified one phase to the different phase. For example, the current supply may be made from specified two phases to different two phases in a five-phase rotary electric machine. It is preferred that a sum of the numbers of the specified phases and the different phases is smaller than the number of total phases of the rotary electric machine.

The rotary electric machine is not limited to a synchronous motor of surface permanent magnet type (SPM) but may be a synchronous motor of implanted permanent magnet type (IPMS) or the like. In this instance, the convergence value cannot be calculated by using the same equation described above. However, since the rotation angle also converges to a certain value by the energization control, the above embodiment may be implemented for such motors.

The motive power generator of the vehicle is not limited to an internal combustion engine, but may be a hybrid of an engine and a motor, or a motor only.

What is claimed is:

1. An in-vehicle electronic control apparatus for an electric power steering system, which includes a multi-phase rotary electric machine and a power conversion circuit connected to the rotary electric machine, the in-vehicle electronic control apparatus comprising:
    an energization control unit configured to control the power conversion circuit to a predetermined operation state to perform predetermined energization of the rotary electric machine;
    an abnormality detection unit configured to detect abnormality in at least one of the rotary electric machine and the power conversion circuit based on a detected rotation angle of the rotary electric machine caused by the predetermined energization; and
    a disconnection abnormality deduction unit configured to detect disconnection abnormality in an electric path connecting corresponding phases of the rotary electric machine and the power conversion circuit,
    wherein the energization control unit is configured to cause energization from one phase to a different phase of the rotary electric machine in the predetermined operation state, the one phase and the different phase being detected as having no disconnection abnormality by the disconnection abnormality detection unit, and
    wherein the abnormality detection unit is configured to detect short-circuit abnormality based on the detected rotation angle, the short-circuit abnormality being a short-circuit between the one phase or the different phase and a remaining phase other than the one phase or the different phase.

2. The in-vehicle electronic control apparatus according to claim 1, wherein:
    the abnormality detection unit is configured to use, as the detected rotation angle of the rotary electric machine a convergence value of the rotation angle of the rotary electric machine caused by the predetermined energization of the rotary electric machine.

3. The in-vehicle electronic control apparatus according to claim 1, further comprising:
    the energization control unit is configured to cause the energization from the one phase to the different phase of the rotary electric machine in response to detection of the disconnection abnormality by the disconnection abnormality detection unit; and
    the remaining phase is a phase of the rotary electric machine, which is detected as having the disconnection abnormality by the disconnection abnormality detection unit.

4. The in-vehicle electronic control apparatus according to claim 1, wherein:
    the power conversion circuit includes a plurality of switching elements, which selectively connect a high potential-side input terminal and a low potential-side input terminal of each phase to a corresponding phase of the rotary electric machine;
    the electric path connected to one of the phases of the rotary electric machine is pulled up or pulled down; and
    the disconnection abnormality detection unit is configured to detect the disconnection abnormality based on voltages developed at junctions between each phase of the rotary electric machine and the power conversion circuit under a condition that the switching elements are all turned off.

5. The in-vehicle electronic control apparatus according to claim 1, further comprising:
    an abnormality control unit configured to control, when the disconnection abnormality in one phase is detected, the power conversion circuit to energize remaining phases of the rotary electric machine; and
    the abnormality control unit is configured to change operation states of the power conversion circuit between cases in which the short-circuit abnormality is detected and not detected.

6. The in-vehicle electronic control apparatus according to claim 1, wherein:
the electric power steering system includes a variable gear device, which varies a ratio of rotations between an output shaft thereof assisted by the rotary electric machine and an input shaft steered by a driver; and
the energization control unit is configured to energize the rotary electric machine under a condition that a ratio of rotation of the input shaft relative to rotation of the output shaft is controlled to a minimum.

7. The in-vehicle electronic control apparatus according to claim 6, further comprising:
a lock control unit configured to control a lock member of the variable gear device, which mechanically locks the input shaft and the output shaft; and
the lock member is driven to unlock mechanical locking between the input shaft and the output shaft to attain the condition that the ratio becomes the minimum.

8. The in-vehicle electronic control apparatus according to claim 1, wherein:
the electric power steering system has an input shaft steered by a driver and an output shaft assisted by the rotary electric machine, the input shaft and the output shaft being mechanically locked and unlocked; and
the predetermined energization by the energization control unit is stopped when the input shaft is steered.

9. The in-vehicle electronic control apparatus according to claim 1, wherein:
the energization control unit is configured to perform the predetermined energization of the rotary electric machine in a period, in which the rotary electric machine is not required to operate.

10. A steering control system for a vehicle, comprising:
the in-vehicle electronic control apparatus according to claim 1; and the electric power steering system.

11. A steering control system for a vehicle having a steering wheel and tire wheels, which are coupled by a shaft, the steering control system comprising:
a multi-phase rotary electric machine for applying assisting torque to the shaft;
a power conversion circuit connected to the rotary electric machine to energize the rotary electric machine; and
an electronic control apparatus configured to check phase voltages between the rotary electric machine and the inverter while stopping an energization operation of the power conversion circuit thereby to detect disconnection abnormality based on the phase voltages,
wherein the electronic control apparatus is further configured to control, when the disconnection abnormality is detected, the inverter to energize remaining normal phases of the rotary electric machine to detect short-circuit abnormality in at least one of the rotary electric machine and the power conversion circuit based on a convergence value of a rotation angle of the rotary electric machine caused by the energization of the remaining normal phases, an
wherein the electronic control apparatus is further configured to control the inverter to drive the multi-phase rotary electric machine in two-phase energization modes, which are different between a short-circuit case, in which both the disconnection abnormality and the short-circuit abnormality are detected, and a disconnection case, in which only the disconnection abnormality is detected.

* * * * *